United States Patent [19]

Ayabe et al.

[11] Patent Number: 5,043,697

[45] Date of Patent: Aug. 27, 1991

[54] APPARATUS FOR DECIDING ENGINE-OIL REPLACING TIME FOR AN AUTOMOBILE

[75] Inventors: Kouichi Ayabe, Tokyo; Seiichi Uchikawa, Matsumoto, both of Japan

[73] Assignee: Tanaka Manufacturing Co., Ltd., Tokyo, Japan

[21] Appl. No.: 586,175

[22] Filed: Sep. 21, 1990

[30] Foreign Application Priority Data

Sep. 25, 1989 [JP] Japan .................. 1-111905[U]

[51] Int. Cl.$^5$ .............................. B60Q 1/00
[52] U.S. Cl. .................. 340/457.4; 340/438
[58] Field of Search ........... 340/438, 457, 441, 450.3, 340/457.4; 73/64

[56] References Cited

U.S. PATENT DOCUMENTS

| | | | |
|---|---|---|---|
| 3,603,880 | 9/1971 | Brecker, Jr. ............ | 340/457.4 X |
| 4,501,005 | 2/1985 | Miller ..................... | 340/457.4 X |
| 4,551,703 | 11/1985 | Bourauel et al. ........ | 340/457.4 |
| 4,580,127 | 4/1986 | Blowers ................... | 340/457.4 X |
| 4,677,847 | 7/1987 | Sawatari et al. ........ | 73/64 |
| 4,742,476 | 5/1988 | Schwartz et al. ...... | 340/457.4 X |

Primary Examiner—Jin F. Ng
Assistant Examiner—Brian Tumm
Attorney, Agent, or Firm—David H. Semmes

[57] ABSTRACT

An apparatus for deciding engine-oil replacing time for an automobile. The apparatus comprises a pulse input unit into which is inputted a pulse generated during the rotation of the engine of an automobile to calculate rotational frequency of the engine on the basis of the pulse, a rotational-frequency integration unit for receiving a signal of rotational frequency of the engine output from the pulse input unit to integrate the rotational frequency of the engine, and a display unit into which is input an integrated value from the rotational-frequency integration unit and in which a degree of oil degradation on the basis of the integrated value is displayed by a display such as a LED, a liquid crystal, a 7-segment or the like.

4 Claims, 1 Drawing Sheet

APPARATUS FOR DECIDING ENGINE-OIL REPLACING TIME FOR AN AUTOMOBILE

BACKGROUND OF THE INVENTION

1. Field of the Invention

The present invention relates to a decision apparatus for displaying replacing time of engine oil for an automobile.

2. Description of the Prior Art

In the past, for decision of time for replacing engine oil for an automobile, there have been employed, generally, a method using a certain period as a standard (for example, the oil is replaced every three months or six months after start of use), and a method using a running distance as a standard (for example, the oil is replaced every 3000 km or 6000 km).

However, the aforesaid methods are merely employed as a standard and do not correspond to degradation of oil caused by a difference in the travelling conditions of automobiles. There was a gap therebetween. That is, in automobiles which often run on crowded roads or mountain paths, the running distance is short despite much rotation of the engine. In such a case, the engine oil severely becomes degraded, and in the replacement of oil using the certain period or the distance as the standard as described above, the life of the engine is shortened.

In view of the foregoing, it is a task of the present invention to display a replacing time of engine oil in conformity with the travelling conditions of automobiles.

SUMMARY OF THE INVENTION

It is therefore an object of the present invention to provide an apparatus for deciding engine-oil replacing time for an automobile comprising a pulse input unit into which is input a pulse generated during the rotation of the engine of an automobile to calculate rotational frequency of the engine as the basis of said pulse, a rotational-frequency integration unit for receiving a signal of rotational frequency of the engine output from said pulse input unit so as to integrate the rotational frequency of the engine, and a display unit into which is input an integrated value from said rotational-frequency integration unit and in which a degree of oil degradation on the basis of said integrated value is displayed by a display such as a LED, a liquid crystal, a 7-segment or the like, this accomplishing the aforementioned task.

According to the present invention, the degree of degradation of oil is displayed on the basis of the integrated value of the rotational frequency of the engine caused by the pulse generated during the rotation of the engine, and a display in conformity with the travelling conditions is obtained.

DETAILED DESCRIPTION OF THE INVENTION

Figure 1:
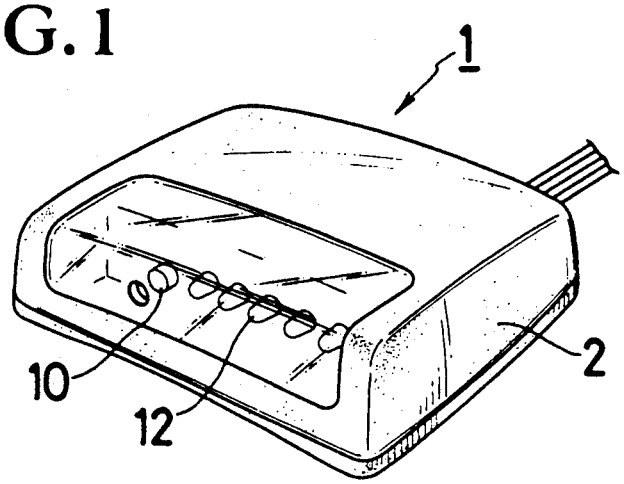
FIG. 1 is a perspective view of an external appearance showing one embodiment of an apparatus for deciding engine-oil replacing time for an automobile according to the present invention.
Figure 2:
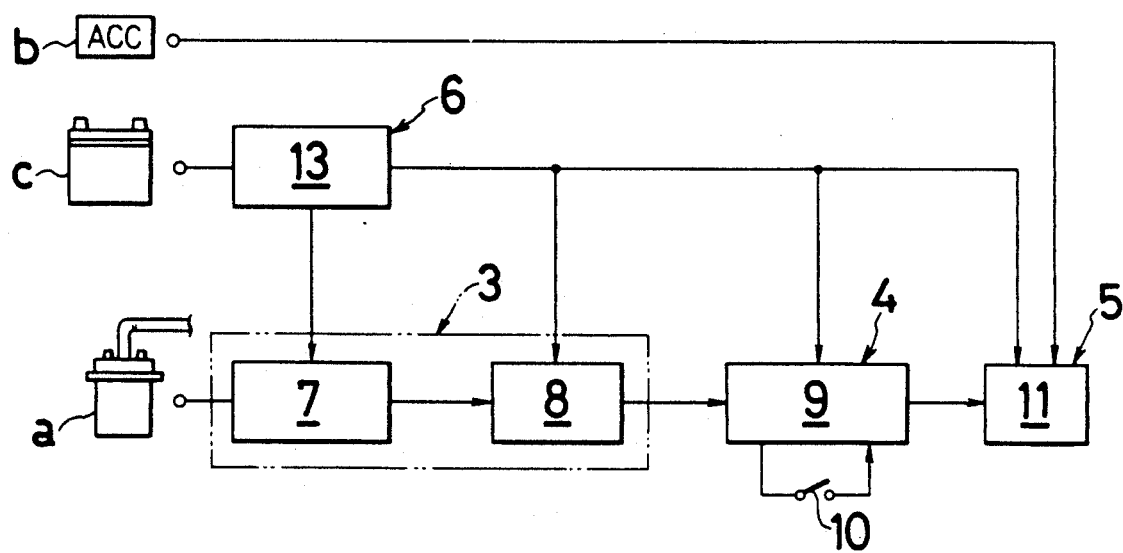
FIG. 2 is a schematic view showing a circuit connection configuration of one embodiment.
Figure 3:
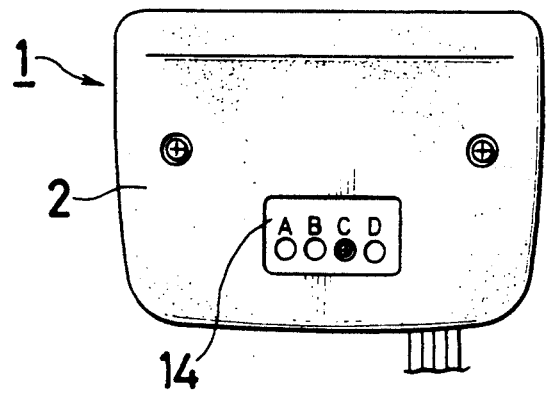
FIG. 3 is a rear elevation showing the back of one embodiment.

The present invention will be described in detail on the basis of one embodiment shown in FIGS. 1 to 3.

In the drawings, reference numeral 1 designates an apparatus for deciding engine-oil replacing time for an automobile. The decision apparatus 1 has a case 2 provided with a pulse input unit 3, a rotational-frequency integration unit 4, a display unit 5 and a power source unit 6. As shown in FIG. 2, the pulse input unit 3 comprises a waveform shaping circuit 7 connected to an ignition coil (−)a, and a cylinder switching circuit 8. The waveform shaping circuit 7 is provided to remove a high frequency generated in the (−) terminal of the ignition coil to shape the waveform and remove signals equal in number to ignition times. The cylinder switching circuit 8 is provided to form the number of ignition signals which are different according to the number of cylinders, the ignition system of the engine and the like, into numerical value proportional to the rotational frequency of the engine.

The rotational-frequency integration unit 4 comprises an engine rotational-frequency integration circuit 9 connected to the cylinder switching circuit 8, the engine rotational-frequency integration circuit 9 integrating the engine rotational-frequency from signals obtained via the cylinder switching circuit 8. A reset switch 10 is provided, and an integration value is set to 0.

The display unit 5 comprises a display circuit 11 for receiving an integration-value signal from the rotational-frequency integration unit 4. The display circuit 11 is provided with a display 12 composed of a plurality of LCDs or LEDs different in color arranged on the front surface of the body case 2. The LCD or LED having one of the colors of the display 12 is turned ON on the basis of the integration-value signal to estimate and display a degree of degradation of oil, namely, oil replacing time. The display unit 5 is provided with a display which is connected to an accessory power source b and the display is actuated only when a voltage is applied to the accessory power source b by a key switch of an automobile.

The power source unit 6 comprises a power source circuit 13 connected to a (+) terminal of a battery power soruce c. The power source circuit 13 is connected to the waveform shaping circuit 7, the cylinder switching circuit 8, the engine rotational-frequency integration circuit 9 and the display circuit 11 so that noises from the battery power source c are removed to stabilize the voltage.

A limit switch 10 is arranged on the front surface of the body case 2. In the cylinder switching circuit 8, a switching portion 14 is arranged, for example, on the back of the body case 2, and a user selects and connects it properly. The display is not limited to LED but a liquid crystal, a 7-segment or the like may also be employed.

As described above, according to the present invention, the decision apparatus comprises a pulse unit into which is input a pulse generated during the rotation of the engine of an automobile to calculate rotational frequency of the engine on the basis of said pulse, a rotational-frequency integration unit for receiving a signal of rotational frequency of the engine output from said pulse input unit to integrate the rotational frequency of the engine, and a display unit into which is input an integrated value from said rotational-frequency integration unit and in which a degree of oil degradation on the basis of said integrated value is displayed by a display such as a LED, a liquid crystal, a 7-segment or the like. Therefore, the degree of oil degration is displayed on the basis of the rotational frequency of the engine. Oil replacement at an adequate time may be carried out, thus exhibiting an effect excellent in practical use.

What is claimed is:

1. An apparatus for deciding engine-oil replacing time for an automobile on the basis of input from the ignition coil comprising:
   a) a pulse input unit including a waveform shaping circuit into which is input a pulse generated by the ignition coil during the rotation of the engine of an automobile to calculate rotational frequency of the engine on the basis of said pulse;
   b) a rotational frequency integration unit for receiving a signal of said pulse input unit and for producing an integrated value based on the rotational frequency of the engine, and
   c) a display unit into which is input the integrated value from said rotational frequency integration unit and in which a degree of oil degradation on the basis of said integrated value is displayed.

2. An apparatus for deciding engine-oil replacing time for an automobile on the basis of input from the ignition coil as in claim 1, wherein said display is a liquid crystal display.

3. An apparatus for deciding engine-oil replacing time for an automobile on the basis of input from the ignition coil as in claim 1, said pulse input unit including a cylinder switching circuit interposed between said waveform shaping circuit and said rotational frequency integration unit, so as to form the signal from said pulse input unit according to the number of cylinders.

4. An apparatus for deciding engine-oil replacing time for an automobile on the basis of input from the ignition coil as in claim 1, wherein said display is a light emitting diode.

* * * * *